United States Patent Office 2,909,963
Patented Oct. 27, 1959

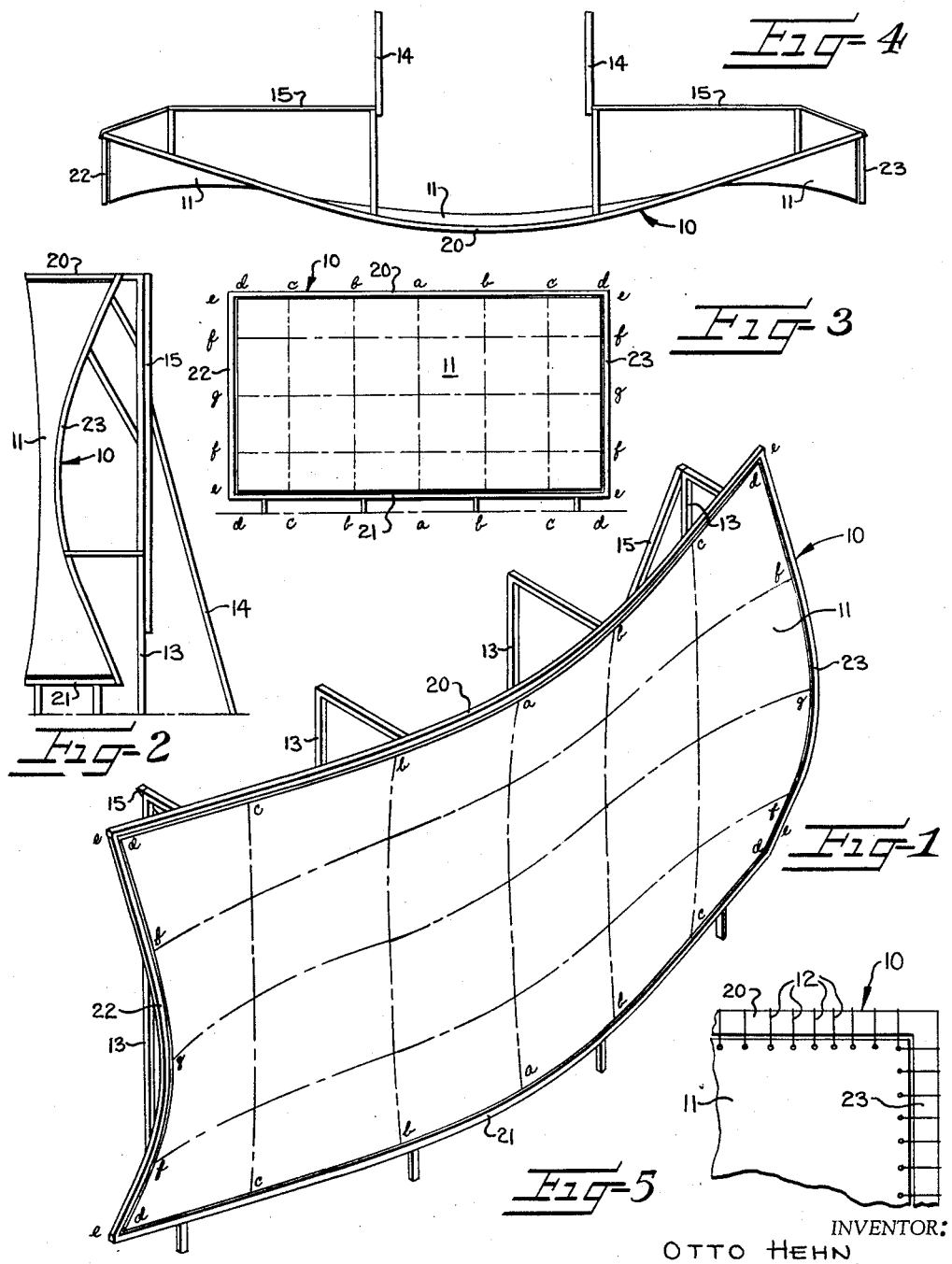

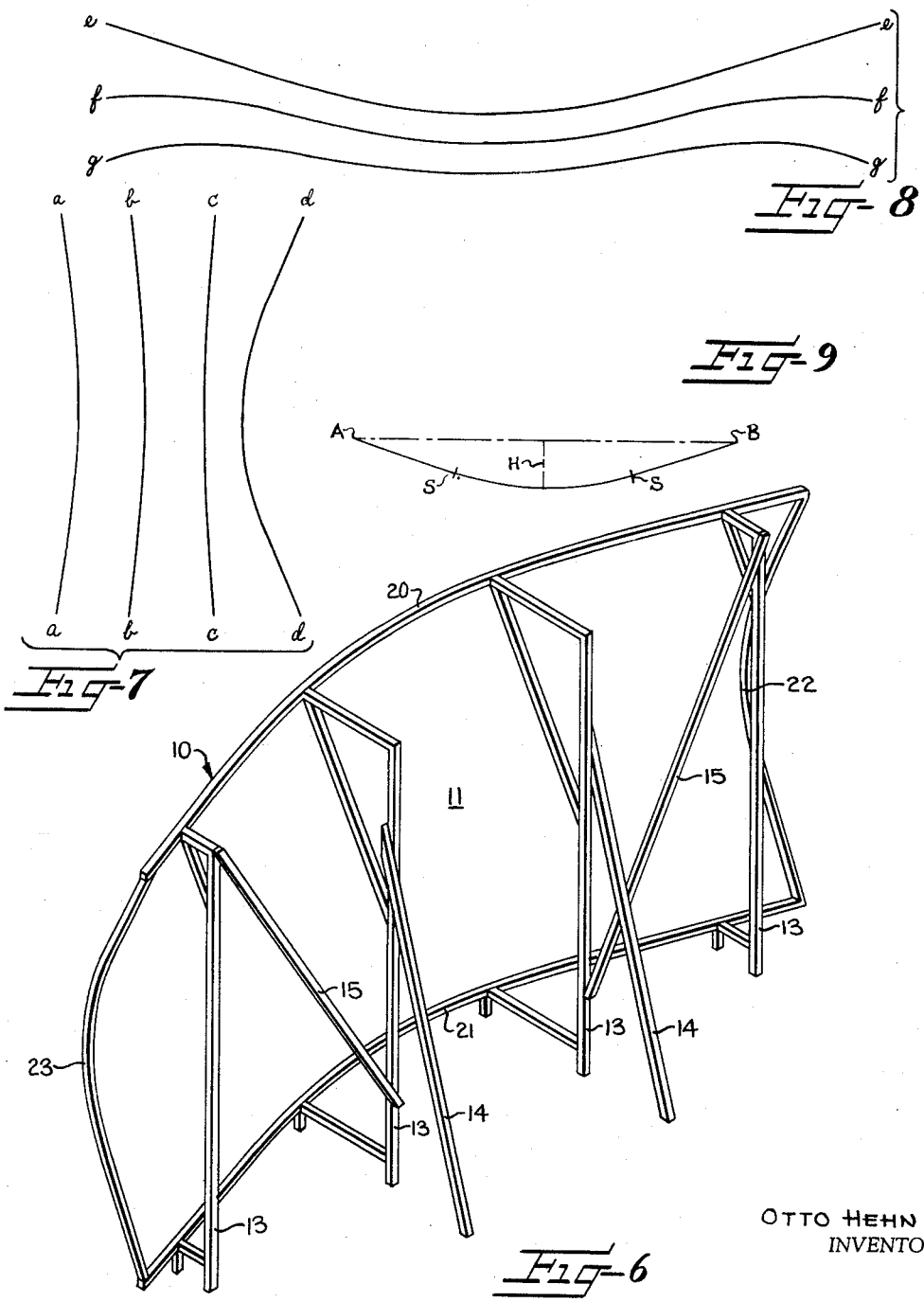

2,909,963

SCREEN

Otto Hehn, deceased, late of Charlotte, N.C., by Thomas G. Lane, Jr., administrator, assignor to Stewart H. Anthony and Doyes Herchell Reinhardt, both of Charlotte, N.C.

Application October 3, 1955, Serial No. 538,415

5 Claims. (Cl. 88—28.9)

The present invention relates to a screen or reflector for reproducing images by illumination, being particularly concerned with screens or reflectors used in connection with the projection of motion pictures, television and the like, and to screens or reflectors other than of the flat surface type.

More particularly, the invention is concerned with the construction of a convex screen or reflector built to simulate the human eye to put into practice Helmholtz's teaching at the University of Berlin in 1887 that everything that we see is an illusion since the human eye sees a straight line as a curve, which curvature or distortion gives the individual the conception of seeing in the third dimension. By constructing a screen or reflector with a predominately convex viewing surface, the illusion of seeing in the third dimension is increased to give fullness and body to the projected image and thus eliminating elongated and distorted images of conventional screens.

To place into practice this teaching of Helmholtz, a screen or reflector having horizontal and vertical convex curves throughout substantially its entire viewing surface was provided. It has been discovered in receiving projected or telecast images, that the horizontal convex curves compensate the retina of the eye to increase the illusion of third dimension while the vertical convex curves compensate for the projecting degree of the projector with respect to the viewing surface of the screen or reflector to eliminate a distorted or elongated picture.

Therefore, it is an object of the invention to provide a predominately convex screen or reflector comprising a supporting frame which holds a screen or reflector therein with the convex curvature of the screen or reflector mathematically and scientifically determined to simulate the function of the human eye for increasing the effect of the third dimension to thereby give a greater depth perception to the eye and completely eliminate elongated and distorted images as heretofore has been the case with other types of screens or reflectors.

This invention is an improvement over prior Patent No. 2,369,143 and the present invention varies basically therefrom in that the screen surface of the instant application is predominantly convexly rather than concavely curved and is a new construction which embodies a different formula for producing a screen surface which closely approximates the function of the human eye.

Some of the objects of the invention having been stated, other objects will appear as the description proceeds when taken in connection with the accompanying drawings, in which—

Figure 1 is a perspective view of the convexly shaped screen or reflector;

Figure 2 is a side elevation as seen from the right side of Figure 1;

Figure 3 is a front elevation;

Figure 4 is a top plan view;

Figure 5 is a fragmentary front elevation showing the manner in which the screen or reflector is secured to the supporting framework;

Figure 6 is a perspective view of Figure 1 as seen from the rear thereof;

Figure 7 is a schematic layout of vertical sectional views showing the vertical curvatures along lines $a$—$a$, $b$—$b$, $c$—$c$ and $d$—$d$ of Figure 3;

Figure 8 is a schematic layout of horizontal sectional views along lines $e$—$e$, $f$—$f$ and $g$—$g$ of Figure 3;

Figure 9 is a diagrammatic layout of a typical top and bottom marginal edge curve.

Referring more specifically to the drawings, for simplicity in describing the invention, a screen or reflector of the type adapted to rest on a supporting surface is shown in the drawings which comprises a supporting framework 10 to the inner edges of which is secured a screen or reflector sheet material 11 formed of any suitable material for reproducing images by illumination, and preferably being a pliable plastic sheet material which is secured to the inner edges of said framework by cords or lacing members 12 passing through apertures formed adjacent the marginal edge portions of the material. To maintain the supporting framework 10 in an upright position, a plurality of posts 13 are provided secured to the framework and spaced from each other along the width of the screen. Auxiliary supporting posts 14 and cross braces 15 are provided for strengthening the supporting frame and increasing the supporting base area so the screen may not be overturned accidentally.

It will be observed from the drawings that the supporting framework 10 which encircles the screen or reflector sheet material 11 conforms to the shape or the outline formed by the marginal edges of the sheet material 11 and therefore a description of the manner for forming the shape and curvature of the framework 10 is deemed sufficient to clearly disclose exactly how the curvature and shape of the sheet material 11 is formed.

Since the invention is directed particularly to wide angle screens, the ratio of the height to the width of the screen varies from a minimum of 1 to 1.65 up to a maximum of 1 to 3. The ratio of height to width must be maintained within these limits for all sizes of wide angle screens or reflectors since the varying of the ratio of the height to the length varies the degree and distance of curvature of the vertical and horizontal axes of the screen or reflector.

To obtain a screen or reflector having the desired convex horizontal and vertical curvatures, a simplified formula has been devised taken from complex mathematical computations. The size of the screen or reflector, that is, the height and width of the same, is first determined by the size of theater or audience to be served, but the ratio of the height to the width must be within the minimum and maximum ratios heretofore set forth. Knowing the desired size of screen to be made, the width of the same is divided by a constant of 6 to 10, preferably by the constant of 8 which quotient is the height or bulge of the forwardmost point of the horizontal curvature relative to the corners of the screen, with the projection angle of the projector with respect to the screen surface being no greater than 5 degrees from an imaginary plane at right angles to the screen. The preferred constant 8 in effect represents approximately 12 percent of the width of the screen for the preferred height of horizontal curvature. However, the height of the horizontal curvature may be 10 to 16 percent of the width. For every 5 degrees of the projection angle above 5 degrees from the imaginary plane, 3½ inches are subtracted from the height of the horizontal curvature. Having found the height of the horizontal curve, two thirds of this height represents the height of the vertical curvature.

Applying this formula to the schematic illustration of Figure 9, line A—B represents the width of the screen, for example 48 feet, which upon being divided by the preferred constant 8 gives a quotient of 6 feet for the height of the horizontal curvature which is represented by the line H in Figure 9. It will be observed in Figure 9 that the height of the horizontal curvature H is the distance from the medial point of the curved surface to the medial point of the line A—B representing the width of the screen. Having determined the height of the horizontal curvature to be 6 feet and knowing that the height of the vertical curvature is two-thirds of the height of the horizontal curvature, a height of 4 feet for the vertical curvature is derived. It should be remembered that the invention is directed to a screen or reflector having a predominantly convex viewing surface both horizontally and vertically of the screen or reflector and the above determined heights for these curvatures represent the extent to which the surface of the screen in effect bulges forwardly as viewed by an observer to simulate the human eye.

Having determined the height of the horizontal and vertical curvatures, the framework to which is secured the marginal edges of the sheet material 11 is then bent or curved along the top and bottom portions 20, 21, respectively, to obtain a horizontal curvature having a height of 6 feet at its medial point (for a screen 48 feet wide) and the sides 22, 23 of the framework 10 are bent or curved to have a height of curvature at its medial point of 4 feet. For every 5 degrees of the projecting angle of the projector above 5 degrees from a horizontal plane with respect to the surface of the sheet material 11, 3½ inches are subtracted from the height of the horizontal curvature. It should also be noted that the corners of the framework 10, as shown in the drawings, lie in a common vertical plane, thus resulting in the sheet material forming the screen 11 having its corners in a common vertical plane.

It is preferred that the horizontal and vertical curvatures of the framework 10 terminate a given distance away from the corners of the framework to obtain flat corner portions in the sheet material 11 to be secured thereon. In Figure 9 the letters S designate the termination points of the horizontal curvature and the sections S—A and S—B represent straight, non-curved portions of the top and bottom portions 20 and 21. The vertical curvatures of the sides 22, 23 of the framework 10 terminate a proportionate distance from the corners of the framework with their end portions also being straight and non-curved. It is preferred that the horizontal and vertical curvatures of the framework 10 comprise 45 to 55 percent of the height and width of the framework.

Having determined the shape and curvature of the framework 10, the sheet material 11 is secured thereto by the cords 12. It is apparent that the curvature of the edges of the sheet material 11 will be substantially the same as the framework 10. The straight framework portions defining the corners of the framework 10 permit the sheet material 11 attached thereto to be mounted free of wrinkles to present a smooth viewing surface. Also, the flattened corner portions of the sheet material 11 appear to present a clearer picture when the same is projected on the sheet material 11, especially when viewed at an extreme angle with respect to either side portion of the screen.

In Figure 7 is schematically illustrated vertical sections taken on respective lines a—a, b—b, c—c and d—d in Figure 3. It will be observed that line a—a through the medial portion of the sheet material 11 has a shallow catenary or slight concave outer viewing surface which curvature is due to the non-rigidity of the sheet material 11 and therefore the failure of the same to follow the exact configuration of the framework 10 in the medial portion thereof. Line c—c in Figure 7 clearly shows the convex curvature of the sheet material 11 prior to reaching its maximum convex curvature along its marginal edge portion as defined by vertical section line d—d which line also represents the sides 22, 23 of the framework 10. It will be observed that the end portions of this line d—d have straight portions comprising 45 to 55 percent of the length of the line or extent of side frame members 22 and 23.

In Figure 8 is schematically illustrated horizontal section lines taken on lines e—e, f—f and g—g in Figure 3 and which clearly illustrate the convex horizontal curvatures of the sheet material 11. Line e—e also represents the top 20 and bottom 21 of the framework 10 and it will be observed that the end portions of this line e—e have straight portions comprising 45 to 55 percent of the length of the line or length of top and bottom frame members 20 and 21.

Since the top portion or the upper half of the screen or reflector as shown in Figure 3 is identical with the lower portion or lower half and the right half of the screen is identical with the left half portion, a further description of the convex horizontal and vertical curvatures is not deemed necessary.

Although the invention is illustrated as applied to a projecting screen or reflector for illuminating of objects thereon the concept of the invention is not restricted thereto since the predominately convex surface defined by these horizontal and vertical curves simulating the human eye may readily be employed as reflecting surfaces in television tubes or receivers to increase the illusion of depth, thereby increasing the perception of the third dimension and thereby avoiding elongated and distorted images which are prevalent in the conventional receivers today.

In the drawings and specification there has been set forth a preferred embodiment of the invention and although specific terms are employed, they are used in a generic and descriptive sense only and not for purposes of limitation, the scope of the invention being defined in the claims.

What is claimed is:

1. A viewing screen of the type described having a generally rectangular shape and having a ratio of height to width of a maximum of 1 to 3, the top, bottom and side marginal edge portions of the screen being convex with respect to the audience to define a screen having a predominantly convex viewing surface, the height of the convex horizontal curve at the medial portion of the top and bottom edge portions of said screen relative to the corners of the screen being approximately 12% of the width of the screen and the height of the convex vertical curve at the medial portion of said edge portions of said screen relative to the corners of the screen being approximately ⅔ of the height of the horizontal curvature.

2. A screen according to claim 1 wherein the corners of said screen are disposed in substantially the same vertical plane and are defined by intersecting straight edge portions comprising 45 to 55% of the total edges of said screen.

3. A screen of the type described comprising an image receiving surface of general rectangular shape, with the ratio of height to width of the screen being a minimum of 1 to 1.65 and a maximum of 1 to 3, said screen having convex horizontal and vertical edges, the height of the curvature at the medial portion of the horizontal edges of the screen relative to the corners of the screen being 10 to 16 percent of the width of the screen, the height of the curvature at the medial portion of the vertical edges of the screen relative to the corners of the screen being two-thirds of the height of the horizontal curvature, and the corner portions of the screen being defined by straight edge portions comprising forty-five to fifty-five percent of the total edge portions of the screen.

4. A screen comprising a rigid substantially rectangular framework having upper, lower and side edge portions defining therebetween a surface for displaying an object, a pliable sheet serving as the surface for displaying an object, means for edgewise tensioning of said sheet to secure the same to said framework, said means for securing said sheet to said framework securing the horizontal edges thereof with the height of the curvature at the medial portion of the horizontal edges of said sheet relative to the corners of said sheet being ten to sixteen percent of the width of said sheet, and said means for securing said sheet to said framework securing the vertical edges thereof with the height of curvature at the medial portion of the vertical edges of the sheet relative to the corners thereof being two-thirds of the height of the horizontal curvature.

5. A device of the type described for displaying an object comprising a rigid rectangular framework having outwardly bowed upper, lower and side frame portions, a screen formed of a pliable material and having an image receiving surface positioned in said framework, means for edgewise tensioning of said screen to secure the same to said framework, the height of the framework with respect to the width thereof being of a minimum ratio of 1 to 1.65 and up to a maximum of 1 to 3, said means for securing said screen to said framework securing the upper, lower and side edges of the screen in a convex path to form a predominately convex screen viewing surface, the height of the curvature at the medial portion of the upper and lower edges of the screen relative to the corners of the screen being ten to 16 percent of the width of the screen, the height of the curvature at the medial portion of the side edges of the screen relative to the corners being two-thirds of the height of the curvature of the upper and lower edges, and wherein the corner portions of the screen are substantially flat.

References Cited in the file of this patent

UNITED STATES PATENTS

| | | |
|---|---|---|
| 938,729 | Voege | Nov. 2, 1909 |
| 1,089,448 | Tillotson | Mar. 10, 1914 |
| 1,526,715 | Moon et al. | Feb. 17, 1925 |
| 2,299,682 | Conant | Oct. 20, 1942 |
| 2,369,143 | Hehn | Feb. 13, 1945 |
| 2,542,789 | Ames | Feb. 20, 1951 |

OTHER REFERENCES

"These Curved Screens," International Projectionist, vol. 28, No. 3, March 1953, page 16.